United States Patent
Krzystofczyk et al.

(10) Patent No.: US 8,983,870 B2
(45) Date of Patent: Mar. 17, 2015

(54) APPARATUS AND METHOD FOR MANAGING SOFTWARE APPLICATIONS USING PARTITIONED DATA STORAGE DEVICES

(75) Inventors: Carl J. Krzystofczyk, Mount Prospect, IL (US); Gary F. Stefanik, Elmhurst, IL (US); Raymond M. Polczynski, Lake in the Hills, IL (US); Richard R. Zarchy, Crystal Lake, IL (US)

(73) Assignee: Snap-on Incorporated, Kenosha, WI (US)

( * ) Notice: Subject to any disclaimer, the term of this patent is extended or adjusted under 35 U.S.C. 154(b) by 709 days.

(21) Appl. No.: 12/858,699

(22) Filed: Aug. 18, 2010

(65) Prior Publication Data

US 2012/0047499 A1 Feb. 23, 2012

(51) Int. Cl.
*G06Q 99/00* (2006.01)
*G06F 9/445* (2006.01)
(Continued)

(52) U.S. Cl.
CPC . *G06F 8/63* (2013.01); *G06F 21/44* (2013.01); *G06Q 2220/10* (2013.01); *H04L 9/32* (2013.01); *G06F 9/445* (2013.01); *G06F 21/105* (2013.01); *G06F 21/121* (2013.01); *G06F 21/629* (2013.01); *G06F 2221/2137* (2013.01)
USPC .......................................................... 705/51

(58) Field of Classification Search
CPC ........... G06F 9/445; G06F 21/44; H04L 9/32; G06Q 2220/10
USPC .......................................................... 705/51
See application file for complete search history.

(56) References Cited

U.S. PATENT DOCUMENTS 5,892,900 A * 4/1999 Ginter et al. .................... 726/26
6,006,035 A 12/1999 Nabahi
(Continued)

FOREIGN PATENT DOCUMENTS

| EP | 0794484 A2 | 9/1997 |
| WO | 2009/109925 A2 | 9/2009 |
| WO | 2009/109925 A3 | 9/2009 |

OTHER PUBLICATIONS

Derthick et al, "Data Exploration across Temporal Contexts", Proceedings of Intelligent User Interfaces (IUI '00), New Orleans, LA, Jan. 2000, pp. 60-67.
(Continued)

*Primary Examiner* — James D Nigh
(74) *Attorney, Agent, or Firm* — McDonnell Boehnen Hulbert & Berghoff LLP

(57) ABSTRACT

Methods, devices, and computer storage media for installation, upgrading, reinstallation, and roll back of software application packages are disclosed. A first software application package is stored in an installation partition of a data storage device of a computing device. The first software application package includes a first software application. The first software application can be installed on an active partition of the data storage device. A first authentication key, associated with the first software application, is determined and stored on the active partition, and then copied to the installation partition. In response to determining that the first software application is to be reinstalled on the active partition: (a) the first software application is reinstalled from the first software application package stored on the installation partition to the active partition, and (b) the associated authentication key stored on the installation partition is copied to the active partition.

17 Claims, 10 Drawing Sheets

(51) Int. Cl.

| | | |
|---|---|---|
| G06F 21/10 | (2013.01) | |
| G06F 21/12 | (2013.01) | |
| G06F 21/62 | (2013.01) | |
| G06F 21/44 | (2013.01) | |
| H04L 9/32 | (2006.01) | |

(56) References Cited

U.S. PATENT DOCUMENTS

| | | | |
|---|---|---|---|
| 6,477,629 B1 | 11/2002 | Goshey et al. | |
| 6,807,665 B2 | 10/2004 | Evans et al. | |
| 6,901,493 B1 | 5/2005 | Maffezzoni | |
| 7,143,067 B1 | 11/2006 | Cheston et al. | |
| 7,146,612 B2 | 12/2006 | Sedlack | |
| 7,305,577 B2* | 12/2007 | Zhang | 714/6.11 |
| 7,353,241 B2 | 4/2008 | Erlingsson | |
| 7,500,238 B2 | 3/2009 | Nestoryak | |
| 7,516,315 B2* | 4/2009 | Wood et al. | 713/1 |
| 7,873,170 B2* | 1/2011 | Chang et al. | 380/286 |
| 8,255,746 B2* | 8/2012 | Lee et al. | 714/38.1 |
| 2002/0188704 A1 | 12/2002 | Gold et al. | |
| 2005/0262334 A1* | 11/2005 | Scudder | 713/1 |
| 2006/0041572 A1 | 2/2006 | Maruyama | |
| 2006/0253724 A1* | 11/2006 | Zhang | 714/2 |
| 2007/0067364 A1 | 3/2007 | Barbian et al. | |
| 2007/0245342 A1 | 10/2007 | Lee et al. | |
| 2008/0022275 A1* | 1/2008 | Herrmann | 717/175 |
| 2008/0126442 A1 | 5/2008 | Cisler et al. | |
| 2008/0219453 A1* | 9/2008 | Chang et al. | 380/286 |
| 2009/0119779 A1 | 5/2009 | Dean et al. | |

OTHER PUBLICATIONS

Gemmell et al., "MyLifeBits: Fulfilling the Memex Vision", 2002, Microsoft Research, San Francisco, CA, available at http://research.microsoft.com/en-us/um/people/gbell/CGB%20Files/MyLifeBitsMM02%200212%20c.pdf (last visited Sep. 8, 2010).

Chan et al, "Essentials of Patch Management Policy and Practice", PatchManagennent.org, Jan. 31, 2004, available at http://www.patchmanagement.org/pmessentials.asp (last visited Sep. 8, 2010).

Microsoft Corp., "Preinstalling Microsoft Windows XP by Using the OEM Preinstallation Kit, Part I", Microsoft Corportation, 2003, available at http://instructor.metrotech.org/~crn/Networking/Windows%20XP%20Pro/OPK_preinstall_intro.doc (last visited Sep. 8, 2010).

Rekimoto, "Time-Machine Computing: A Time-centric Approach for the Information Environment", ACM UIST'99, 1999, available at http://www.csl.sony.co.jp/person/rekimoto/papers/uist99.pdf (last visited Sep. 8, 2010).

Breen, "Rewind 1.1", Macworld.corn, Apr. 1, 2001, available at http://www.macworld.com/reviews/product/407039/review/rewind_11.h (last visited Sep. 8, 2010).

Van Der Hoek et al., "Software Release Management", Sixth European Software Engineering Conference with the Fifth ACM SIGSOFT Symposium on the Foundations of Software Engineering, Sep. 1997, pp. 159-175, available at http://www.ics.uci.edu/~andre/papers/C5.pdf (last visited Sep. 8, 2010).

Anonymous, "Disk Cloning", Jul. 5, 2010, Retrieved from the Internet at http://en.wikipedia.org/w/index.php? title=Disk_cloning&oldid=371886317 (last visited Apr. 12, 2012).

International Bureau, International Search Report for PCT/US2011/047141, mailed Mar. 12, 2012.

* cited by examiner

APPARATUS AND METHOD FOR MANAGING SOFTWARE APPLICATIONS USING PARTITIONED DATA STORAGE DEVICES

BACKGROUND

Vehicles, such as automobiles, light-duty trucks, and heavy-duty trucks, play an important role in the lives of many people. To keep vehicles operational, some of those people rely on vehicle technicians to diagnose and repair their vehicle.

Vehicle technicians use a variety of tools in order to diagnose and/or repair vehicles. Those tools may include common hand tools, such as wrenches, hammers, pliers, screwdrivers and socket sets, or more vehicle-specific tools, such as cylinder hones, piston ring compressors, and vehicle brake tools. The tools used by vehicle technicians may include electronic tools, such as one or more software applications used to analyze data and/or provide information to vehicle technicians. Typically, vehicle technicians are not trained in software engineering or maintenance.

Frequently, these software applications become important to the day-to-day performance of vehicle technicians. As such, inoperable software applications can be costly. Conventional responses to inoperable software applications include: doing nothing, sending a computing device to software repair personnel, providing on-site repair assistance, or restoring the computing device to an initial state (a.k.a. the "factory-new" state). These responses have the drawbacks of not maintaining system functionality (if doing nothing), incurring downtime to send the computing device, requiring software repair personnel to travel on-site, requiring reloading and reinstallation of already installed software degrade system performance at all times, and/or causing the saved-and-updated software to become unstable via operation of the restore utility.

OVERVIEW

Various example embodiments are described in this description. In one respect, an example embodiment may take the form of a method that includes: (i) storing a first software application package in an installation partition of a data storage device communicatively coupled to a computing device, where the first software application package includes a first software application, (ii) installing the first software application from the first software application package onto an active partition of the data storage device, (iii) determining a first authentication key associated with the first software application and storing the first authentication key on the active partition, (iv) copying the first authentication key to the installation partition, and (v) in response to determining the first software application is to be reinstalled: (a) reinstalling the first software application from the first software application package stored on the installation partition to the active partition, and (b) copying the associated authentication key stored on the installation partition to the active partition.

In a second respect, an example embodiment may take the form of a method that includes: (i) partitioning a first data storage device communicatively coupled to a computing device into at least an active partition and an installation partition, (ii) storing a software application package on the installation partition, where the software application package comprises application software, (iii) installing the application software onto the active partition from the software application package, (iv) initializing at least one system parameter stored on the active partition of the data storage device; and (v) in response to installing the application software and initializing the at least one system parameter, generating an image of the first data storage device, where the image of the first data storage device includes an image of the active partition and an image of the installation partition.

In a third respect, an example embodiment may take the form of a computing device that includes a data storage device, a processor, and instructions. The data storage device is configured with at least an active partition and an installation partition. The instructions are stored in the data storage device. Upon execution of the instructions by the processor, the computing device is caused to perform functions. The functions include: (i) installing a software application from a software application package stored on the installation partition to the active partition, where the software application package includes a software application, (ii) determining an authentication key associated with the software application and storing the authentication key on the active partition, (iii) saving the associated authentication key on the installation partition, and (iv) in response to determining the software application is to be reinstalled: (a) reinstalling the software application from the software application package stored on the installation partition to the active partition, and (b) copying the associated authentication key stored on the installation partition onto the active partition.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings, wherein like numerals denote like entities, in which.

DETAILED DESCRIPTION

I. Introduction

Figure 1:
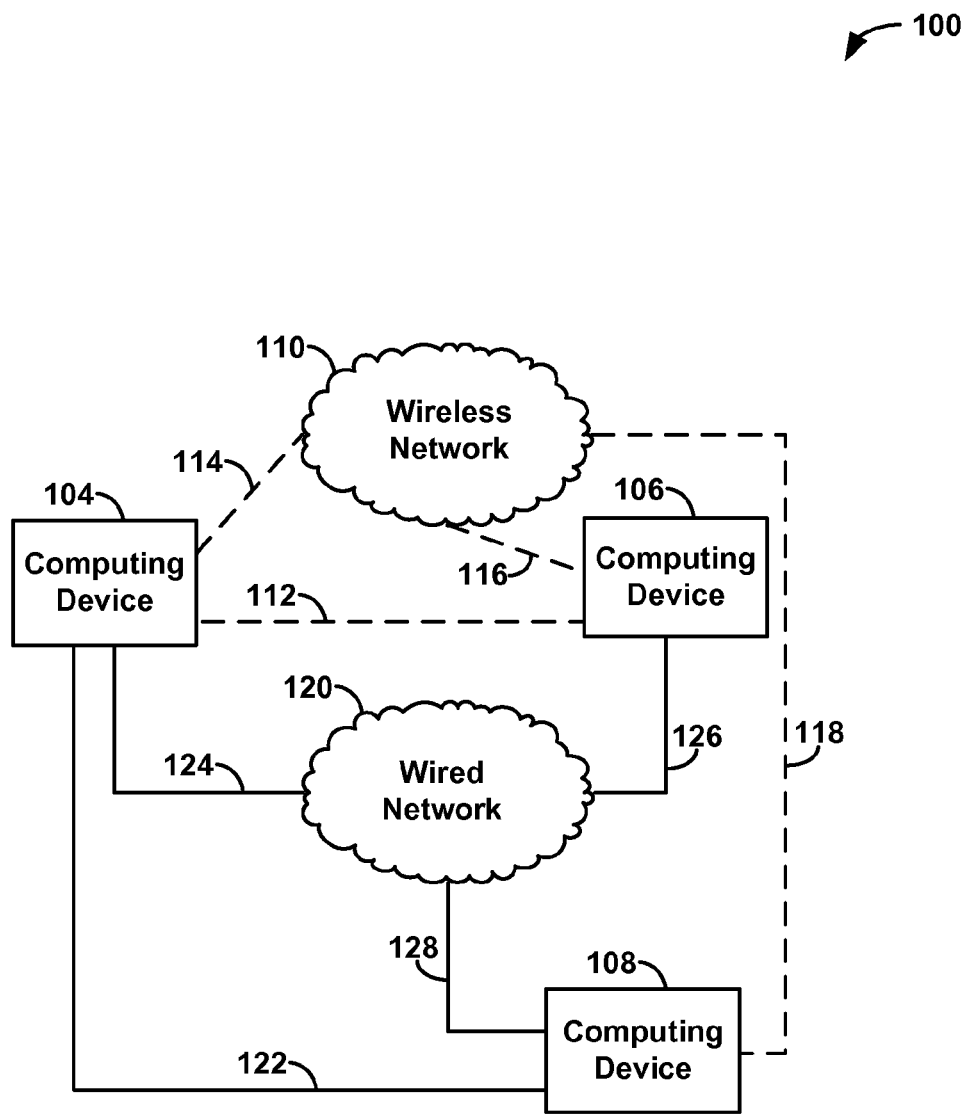
FIG. 1 is a block diagram of a system in accordance with an example embodiment.

Software applications, such as software for vehicle repair/diagnosis, can require updates and recovery for repairing inoperable software to ensure operational stability and performance. To update and recover software applications, one or more "software application packages" stored on one or more "partitions" of a data storage device communicatively coupled to a computing device can be used. As described herein, the data storage device is partitioned to include a herein-described "application partition" configured for storing one or more software application packages and related "authentication keys". Each software application package can store a software application, which can include computer-readable instructions configured to be executed as the software application, computer-readable instructions configured to install the computer software application, and associated data for both sets of computer-readable instructions.

The software application package can be provided to a user of the software application package as an executable file. Upon execution, the software application package can copy the software application to an "active partition" of the data storage device. The active partition can store the software and data used to operate a computing device, including but not limited to an operating system of the computing device and the software application.

In some embodiments, upon execution, the software application can use one or more authentication keys associated with the software application (e.g., software licensing data). The authentication keys can enable some or all of the functionality of the software application. In particular embodiments, the authentication keys are determined and stored on the active partition and copies of the authentication keys are also stored on the installation partition, along with the associated software application package.

As such, the active partition can store software and data required for normal operation of the computing device and the application partition can store one or more backup copies of the software application, perhaps stored in a software application package, and associated authentication keys.

If the software application needs to be reinstalled, the software application package stored on the application partition can replace the software application stored on the active partition. As part of a reinstallation procedure, the authentication keys associated with the software application can be copied from the application partition to the active partition as well. A similar procedure can be used to upgrade application software. For example, a new software application package can be copied to the application package and executed to install the upgraded software application on the active partition. New authentication keys for the upgraded software application can be determined, stored on the active partition, and also copied to the application partition.

Using these techniques, software installation often can be performed without the assistance of computer repair personnel; i.e., software installation and recovery can be performed by a typical automotive technician, and does not require the assistance of a computer specialist. This approach ensures software applications and associated authentication keys are installed or reinstalled to a known working state. In particular, the known working state is often the latest version of the software application, which can be an updated version of the original version of the software application. Advantageously, the installation procedure does not require the erasure of user data.

By copying the associated authentication keys from the application partition during the recovery process, authorization to run/access the software application is automatically restored. Barring hardware damage (e.g., a crash of the data storage device), the installation, reinstallation, upgrade, and roll back techniques described herein are reliable and relatively quick. In some embodiments, recovery of a software application can take less than an hour, in comparison to several days lost during a factory return. As such, the cost of failure recovery and restoring the software application is relatively low, especially when compared to the required downtime waiting for the return of computer equipment and/or the arrival of on-site personnel. Further, the procedures described herein can minimize or reduce recurring engineering costs by allowing end-users to easily and efficiently recover and upgrade application software with minimal support from recurring engineering personnel. While the software applications described herein involve software for vehicle repair/diagnosis, one of skill in the art would readily recognize these techniques are applicable to many other software applications and associated authentication keys configured to carry out many other types of tasks beyond or including vehicle repair/diagnosis as well.

II. Example Architecture

FIG. 1 is a block diagram of a system 100 in accordance with an example embodiment. System 100 comprises computing devices 104, 106, and 108. FIG. 1 shows wireless links using dashed lines and wired links using solid lines.

The block diagram of FIG. 1 and other block diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements can be carried out by a processor executing computer-readable program instructions and/or by any combination of hardware, firmware, and software.

A wireless network 110 may be established between any two or more of devices 104, 106 and 108. Any one of those devices may join (e.g., begin communicating via) wireless network 110 after wireless network 110 is established. As an example, FIG. 1 shows wireless network 110 connected to: computing device 104 via wireless link 114, computing device 106 connected via wireless link 116, and computing device 108 via wireless link 118. In some embodiments, a wireless link includes a point-to-point wireless connection between two devices, such as wireless link 112 between computing devices 104 and 106. Computing devices 104, 106, and 108 are operable to carry out communications with each other via wireless network 110. Other devices, such as a personal digital assistant (PDA) may be operable to join wireless network 110 as another remote device so as to communicate with other devices communicating via wireless network 110.

Wireless network 110 may comprise one or more wireless networks. Each of the one or more wireless networks may be arranged to carry out communications according to a respective air interface protocol. Each air interface protocol may be arranged according to an industry standard, such as an Institute of Electrical and Electronics Engineers (IEEE) standard. The IEEE standard may comprise an IEEE 802.11 standard for Wireless Local Area Networks (e.g., IEEE 802.11 a, b, g, or n), an IEEE 802.15 standard for Wireless Personal Area Networks, an IEEE 802.15.1 standard for Wireless Personal Area Networks—Task Group 1, an IEEE 802.16 standard for Broadband Wireless Metropolitan Area Networks, or some other IEEE standard. For purposes of this description, a wireless network arranged to carry out communications according to the IEEE 802.11 standard is referred to as a Wi-Fi network, a wireless network arranged to carry out communications according to the IEEE 802.15.1 standard is referred to as a Bluetooth network, and a wireless network arranged to carry out communications according to the IEEE 802.16 standard is referred to as a WiMAX network.

One or more of computing devices 104, 106, and 108 can connect to a wired network 120. Computing devices 104, 106, and 108 can connect to wired network 120 via wired links 124, 126, and 128, respectively. Wired network 120 may include and/or connect to the Internet, and wired network 120 may include and/or connect to one or more network nodes (not shown in FIG. 1). In some embodiments, a wired link includes a point-to-point wired connection between two devices, such as wired link 122 between computing devices 104 and 108.

Figure 2:
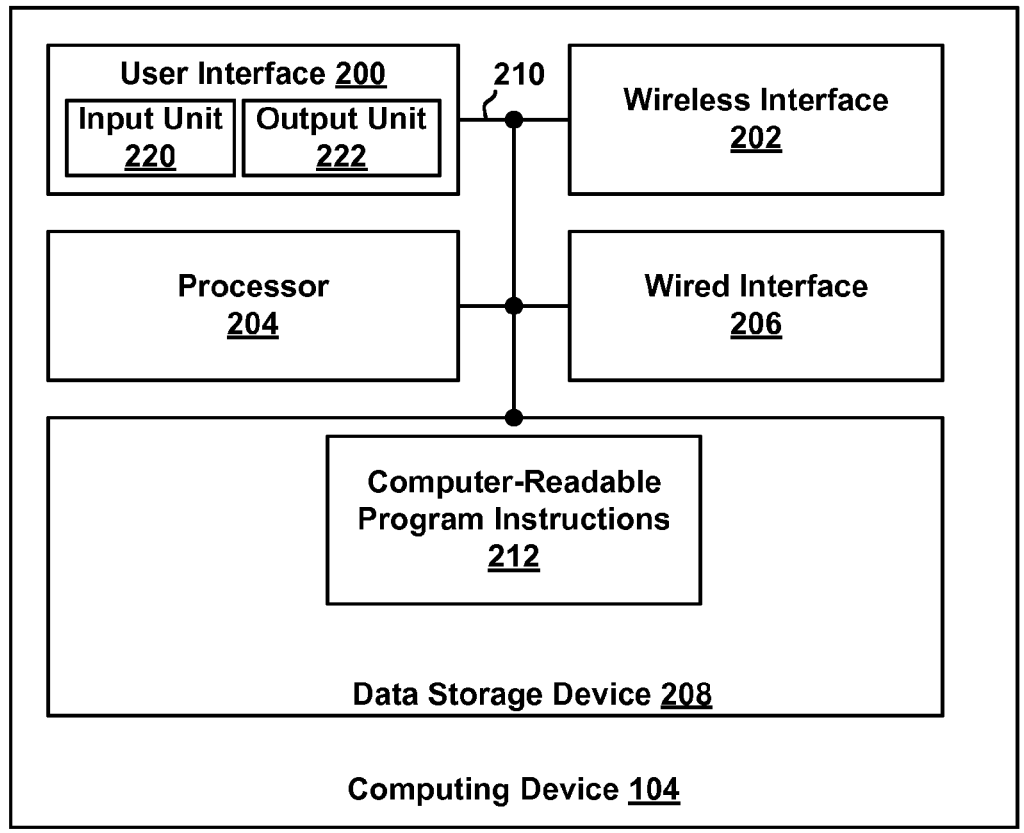
FIG. 2 is a block diagram of an example computing device.

FIG. 2 is a block diagram of an example computing device 104. As illustrated in FIG. 2, computing device 104 includes a user interface 200, a wireless transceiver 202, a processor 204, a wired interface 206, and a data storage device 208, all of which may be linked together via a system bus, network, or other connection mechanism 210.

User interface 200 is operable to present data to and/or receive data from a user of computing device 104. The user interface 200 can include input unit 220 and/or output unit 222. Input unit 220 can receive input, perhaps from a user of the computing device 104. Input unit 220 can comprise a keyboard, a keypad, a touch screen, a computer mouse, a track ball, a joystick, and/or other similar devices, now known or later developed, capable of receiving user input at computing device 104.

Output unit 222 can provide output, perhaps to a user of the computing device 104. Output unit 222 can comprise a visible output device for generating visual output(s), such as one or more cathode ray tubes (CRT), liquid crystal displays (LCD), light emitting diodes (LEDs), displays using digital light processing (DLP) technology, printers, light bulbs, and/or other similar devices, now known or later developed, capable of displaying graphical, textual, and/or numerical information. Output unit 222 can alternately or additionally comprise one or more aural output devices for generating audible output(s), such as a speaker, speaker jack, audio output port, audio output device, earphones, and/or other similar devices, now known or later developed, capable of conveying sound and/or audible information.

Wireless interface 202 comprises one or more wireless transceivers operable to carry out communications via wireless network 110. Wireless interface 202 can include a Bluetooth transceiver, a Wi-Fi transceiver, a WiMAX transceiver, and/or some other type of wireless transceiver. Wireless transceiver 202 can carry out communications with computing devices 106 and 108, or another device configured to communicate via wireless network 110. In accordance with an embodiment in which wireless transceiver 202 includes three or more wireless transceivers, two or more of the wireless transceivers may communicate according to a common air interface protocol or different air interface protocols.

Processor 204 may comprise one or more general purpose processors (e.g., microprocessors manufactured by Intel or Advanced Micro Devices) and/or one or more special purpose processors (e.g., digital signal processors). Processor 204 may execute computer-readable program instructions 212 that are contained in computer-readable data storage device 208 and/or other instructions as described herein.

Wired interface 206 can be configured to communicate with a wired network, such as wired network 120. Wired interface 206 can comprise a port, a wire, a cable, a fiber-optic link or a similar physical connection to a data network, such as a wide area network (WAN), a local area network (LAN), one or more public data networks, such as the Internet, one or more private data networks, or any combination of such networks, such as wired network 120.

In some embodiments, wired interface 206 comprises a Universal Serial Bus (USB) port. The USB port can communicatively connect to a first end of a USB cable, while a second end of the USB cable can communicatively connect to a USB port of another device In other embodiments, wired interface 206 comprises an Ethernet port. The Ethernet port can communicatively connect to a first end of an Ethernet cable, while a second end of the Ethernet cable can communicatively connect to an Ethernet port of another device that perhaps is connected to wired network 120.

Data storage device 208 may comprise a computer-readable storage medium readable by processor 204. The computer-readable storage medium may comprise volatile and/or non-volatile storage components, such as optical, magnetic, organic or other memory or disc storage, which can be integrated in whole or in part with processor 204. In some embodiments, data storage device 208 is implemented on one physical device (e.g., one optical, magnetic, organic or other memory or disc storage unit), while in other embodiments data storage device 208 can comprise two or more physical devices.

Data storage device 208 may include computer-readable program instructions 212 and perhaps other data. Computer-readable program instructions 212 can include instructions executable by processor 204 and any storage required, respectively, to perform at least part of the herein-described techniques.

Figure 3:
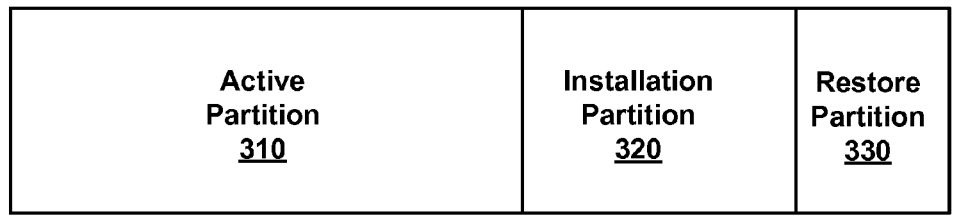
FIG. 3 is a block diagram of an example partitioned data storage device.

In some embodiments, data storage device 208 is configured to be partitioned into two or more "partitions" that each provide separate data storage areas. FIG. 3 illustrates a block diagram of an example partitioned data storage device 208. A partition of data storage device 208 can provide logical access (i.e., access to operating system and/or application software) to part or all of a physical device used as data storage device 208.

Each partition can store software and/or data, including random-access data, files, and directory/folder structures. In particular embodiments, a partition can include a "file system" to organize for data and files stored within the partition. Example types of file systems include, but are not limited to, File Allocation Table (FAT) file systems, Windows NT File System (NTFS) file systems, UNIX file systems, Linux file systems, Solaris file systems, Apple's Operating System X (OS X) file systems, and/or direct access storage device (DASD)-compatible file systems. In some embodiments, each partition of data storage device 208 uses the same type of file system; while in other embodiments, partitions of data storage device 208 collectively use two or more different types of file systems.

Each partition of data storage device can be accessed via software, perhaps after an initial configuration step. In some embodiments, a logical "drive" is associated with each partition. For example, the Microsoft Windows® family of operating systems associates a drive (e.g., "C:", "D:") with each partition, and software desiring to access data on a specific partition begins a "pathname" with the drive (e.g., "C:\Windows"). In some scenarios, Windows® operating systems require user action (e.g., insert a data storage device into a USB or other port, install an Ethernet cable) before the data storage device will be accessible to the software, while in other cases, Windows® operating systems can make partitions/data storage devices available to software during part of a "boot" or system initialization process. Windows® is a registered trademark of Microsoft Corporation in the United States and other countries.

In other embodiments, a "mount point" or directory is associated with each partition. For example, UNIX®-type operating systems provide a command (e.g., "mount") to associate the mount point with part or all of a physical device. For example, the UNIX® command line "mount /dev/disk1 /disk1" would associate the physical device "/dev/disk1" with mount point "/disk1." Software desiring to access data on physical device /dev/disk1 could then use a pathname starting with "/disk1" (e.g., "/disk1/file2"). UNIX®-type operating systems can make one or more partitions/data storage devices available as part of a boot process, while other partitions/data storage devices can require user action for access. UNIX® is a registered trademark of The Open Group.

Example partitioned data storage device 208 is shown in FIG. 3 with three partitions: active partition 310, installation partition 320, and restore partition 330. Active partition 310 can be configured to store all data and computer-readable program instructions for executing operating system and application software on a computing device, such as computing device 104. That is, active partition 310 can store, but is not limited to storing, operating system software, application software, operating system data (e.g., system parameters, registry information, temporary or working files), application data (e.g., application parameters, databases, application-generated temporary or working files) used while computing device 104 is in operation.

Installation partition 320 can be configured to store all data and computer-readable program instructions for restoring, updating, and/or "rolling back" a software application.

Restore partition 330 can be configured to store all data and computer-readable program instructions to restore an operating system of computing device 104 to an initial/factory-new state. In some embodiments, restore partition 330 stores an "operating system image" or copy of the operating system at a known state, such as the initial/factory-new state. As such, part of a recovery process to recover from an operating system and/or hardware failure of computing device 104 can include copying the operating system image from restore partition 330 to active partition 310 and "booting" or initializing computing device 104 and operating system.

Example uses of active partition 310, installation partition 320, and restore partition 330 are described in additional detail in the context of FIGS. 4A, 4B, 5, 6, 7, 8, 9, and 10 below.

In some embodiments, active partition 310 and installation partition 320 are configured as "visible" partitions and restore partition 330 is configured as a "hidden" partition. A visible partition can be accessed (i.e., data can be read, written, updated or deleted) during normal operation of computing device 104 without use of computer-diagnostic software. In contrast, a hidden partition typically cannot be accessed without use of specialized computer-diagnostic software, such as a partition editor or recovery software.

In still other embodiments, only active partition 310 is a visible partition (i.e., installation partition 320 and restore partition 330 are both hidden partitions). In some other embodiments, active partition 310, installation partition 320, and restore partition 330 are all visible partitions.

In embodiments not shown in FIG. 3, data storage device 208 can have one or more additional partitions beyond active partition 310, installation partition 320, and restore partition 330. Examples of additional partitions include, but are not limited to, data partitions, user-defined partitions, and additional restore partitions. These additional partition(s) can be visible partition(s) and/or hidden partition(s). In still other embodiments not shown in FIG. 3, data storage device 208 can be partitioned with active partition 310 and installation partition 320, but without restore partition 330.

In other embodiments, each partition can be stored on a separate physical storage device. As one example, active partition 310 is stored on a disc storage unit, installation partition 320 is stored on non-volatile storage media (e.g., a flash drive), and restore partition is stored on another non-volatile storage media (e.g., a different flash drive or a static state drive). As another example, each partition 310, 320, and 330 is stored on a separate disc storage unit.

III. Example Operational Scenarios

Figure 4A:
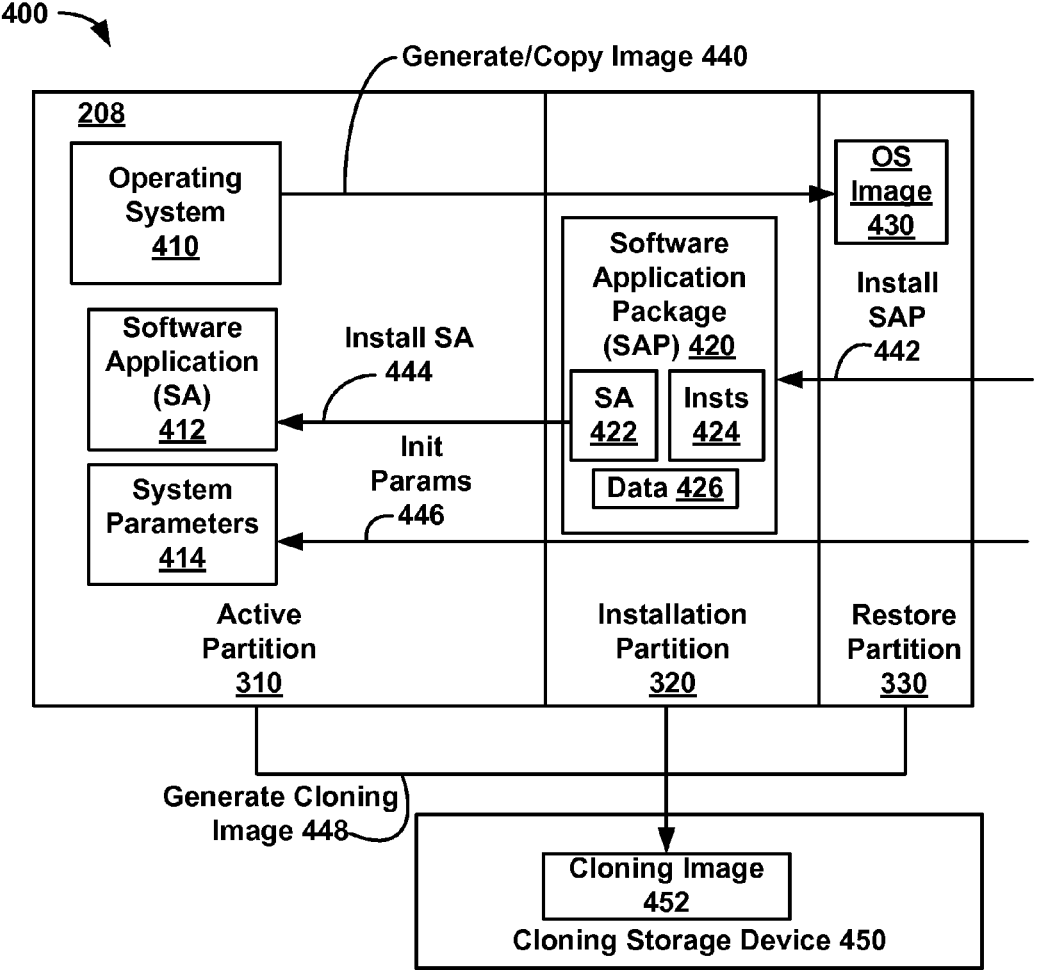
FIG. 4A illustrates a scenario for generating and storing a cloning image.

FIG. 4A illustrates a scenario 400 for generating and storing a "cloning image" or copy of one or more partitions, discussed in detail below. Scenario 400 assumes data storage device 208 is partitioned with active partition 310, installation partition 320, and restore partition 330 as shown in FIG. 3, and that data storage device 208 is communicatively coupled with computing device 104. Scenario 400 also assumes that data storage device 208 initially includes operating system 410 stored on active partition 310.

Scenario 400 begins with generate/copy image command 440 that copies an "image" or copy of operating system 410 from active partition 310 to restore partition 330 as operating system (OS) image 430. Operating system image 430 can be a compressed or uncompressed copy of operating system 410. In some scenarios not shown in FIG. 4A, generate/copy image command 440 is omitted.

Install software application package (SAP) command 442 copies software application package 420 on installation partition 320. Software application package (SAP) 420 can be copied on installation partition 320 from various locations, including but not limited to, a separate data storage device (e.g., a flash drive, external hard drive), a partition of data storage device 208 not shown in FIG. 4A, a wired network via wired interface 206, or a wireless network via wireless interface 208.

FIG. 4A shows software application package 420 with software application 422, instructions ("Insts") 424, and data 426. Software application 422 can include computer-readable program instructions that, when executed by a processor (e.g., processor 204), enable a device (e.g., computing device 104) to carry out functions related to a task, such as, but not limited to, tasks related to vehicle repair/diagnosis. In some embodiments, software application 422 is configured to carry out functions related to other types of tasks beyond vehicle repair/diagnosis.

Instructions 424 can include computer-readable program instructions to install software application 422 for use with computing device 104. Example instructions 424 include, but are not limited to, file operation instructions (e.g., copying, creating, replacing, and/or removing files, folders, and/or directories), data modification instructions (e.g., instructions to save/modify registry entries and/or database values), user input/output instructions (e.g., instructions to receive input related to installation options, requests for confirmation to install software application 422, installation status displays, help information), networking instructions (e.g., copying, creating, replacing, and/or removing data to/from wired and/or wireless networks), and/or other instructions (e.g., generating log file data, maintaining installation status of software application package 420 and/or software application 422).

Data 426 can include data required for use by software application 420 and/or instructions 422, such as but not limited to, initialization data, configuration data, and/or application-specific data. Data 426 can be stored in a variety of formats, such as, but not limited to, a database, in a flat file, in one or more other types of files, and/or in one or more other formats.

Install software application (SA) command 444 of scenario 400 copies software application 422 from installation partition 322 as software application 412 on active partition 310. In some embodiments, software application package 420 can be configured as an "executable" file; i.e., a file that includes instructions that can be executed upon command. As such, install software application command 444 can involve executing instructions 424 of software application package 420 by a processor (e.g., processor 204 of computing device 104). Install software application command 444 can also include use of other file operation instructions, user input/output instructions, network instructions, and/or other instructions, such as discussed immediately above.

In some scenarios, install software application command 444 is executed via use of a software package manager, described below in the context of FIG. 8.

Initialize parameters command 446 (shown as "Init Params" in FIG. 4A) initializes one or more system parameters 414 to initial or default values. In some scenarios not shown in FIG. 4A, initialize parameters command 446 is omitted or initialize parameters command 446 is executed before install software application command 442 and/or install software application command 444.

Generate cloning image 448 command generates cloning image 452. Cloning image 452 is a copy of at least partitions 310, 320, and 330 stored on cloning storage device 450. In some embodiments, cloning image 452 is uncompressed; while in other embodiments, part or all of cloning image 452 is compressed. In some embodiments not shown in FIG. 4A, cloning storage device 450 is part of data storage device 208 (e.g., cloning storage device 450 is implemented as a partition of data storage device 208).

In embodiments not shown in FIG. 4A, cloning image 452 can be copied from cloning storage device 450 to one or more other data storage devices. As such, cloning image 452 can act as a baseline image for initializing the one or more other data storage devices, so that each of the one or more other data storage devices includes (a) an active partition that stores copies of operating system 410, software application 412, and system parameters 414, (b) an installation partition that stores a copy of software application package 420 (which in turn stores software application 422 and instructions 424), and (c) a restore partition that stores a copy of operating system image 430.

As shown in FIG. 4A, at the end of scenario 400, active partition 310 stores operating system 410, software application 412, and system parameters 414; installation partition 320 stores software application package 420 (which in turn stores software application 422 and instructions 424); restore partition 330 stores operating system image 430; and cloning storage device 450 stores cloning image 452.

Figure 4B:
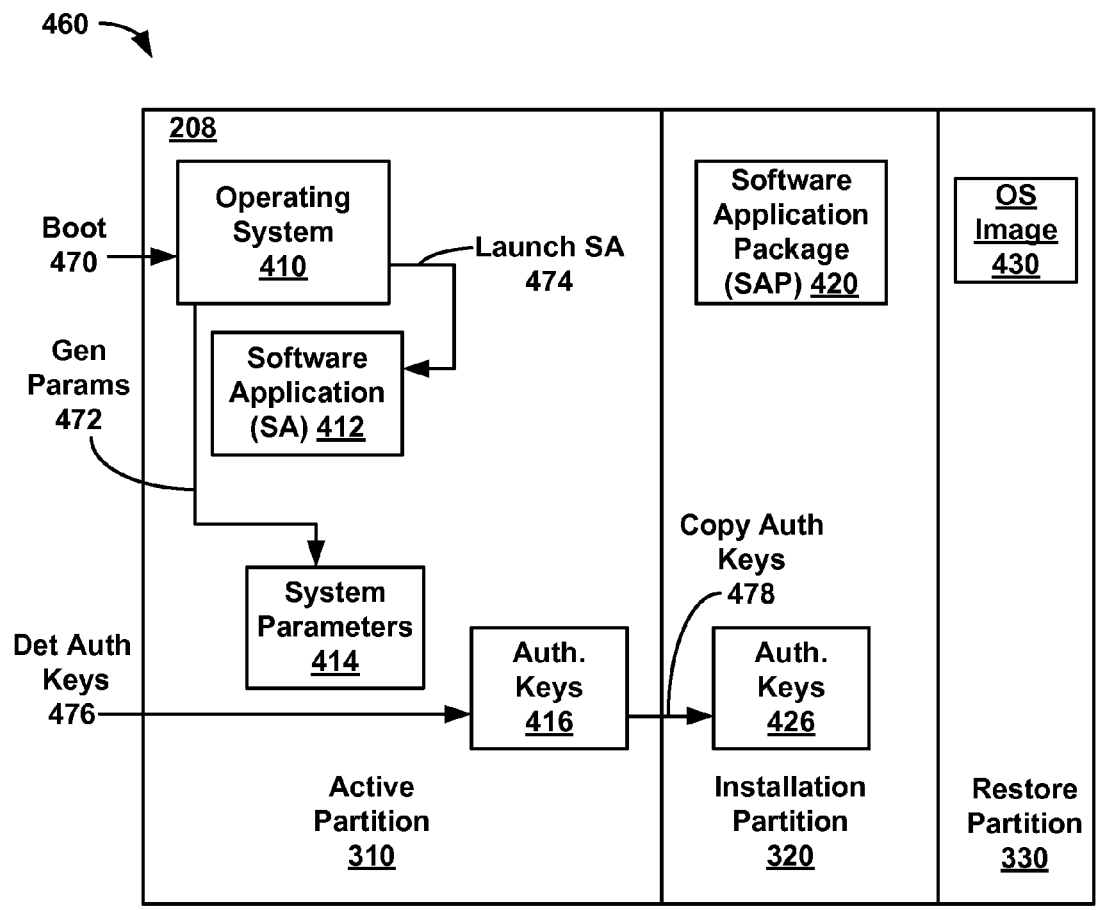
FIG. 4B illustrates a scenario for initializing a software application.

FIG. 4B illustrates a scenario 460 for initializing a software application. As described herein, scenario 460 begins after the techniques of scenario 400, described above in the context of FIG. 4A, have been carried out. Scenario 460 assumes that data storage device 208 is communicatively coupled with computing device 104 and that data storage device 208 stores at least the data and software on partitions 310, 320, and 330 as indicated at the end of scenario 400.

Scenario 460 begins with boot command 470, which can initialize computing device 104 and operating system 410.

Generate parameters command 472 (shown as "Gen Params 472" on FIG. 4B) generates and/or updates system parameters 414 with non-default values. Example system parameters that can be generated and/or updated by generate parameters command 472 include, but are not limited to, system names, account names, account passwords, status parameters, and/or network address parameters (e.g., Internet Protocol (IP) and/or Media Access Layer (MAC) addresses.) In some embodiments, generate parameters command 472 is executed automatically as part of boot command 470; while in other embodiments, generate parameters command 472 is executed in response to a request or command to generate/update system parameters. In some scenarios not shown in FIG. 4B, generate parameters command 472 is omitted.

Launch software application (SA) command 474 starts execution of software application 412. FIG. 4B shows operating system 410 performing launch software application command 474 as application programs such as software application 412 are typically started via use of one or more operating system functions (e.g., user-interface commands/directive processing, operating system primitives, and/or function calls).

Determine authentication keys command 476 (shown in FIG. 4B as "Det Auth Keys 476") determines one or more authentication keys 416 for use with software application 412. Authentication keys 416 can include one or more software licensing keys, indicating that software application 412 is licensed for use on computing device 104. Other authentication keys 416 are possible as well, such as, but not limited to, user identifiers, passwords, encryption keys, decryption keys, and/or other authentication keys (e.g., authentication data for financial or other information).

In some embodiments, determine authentication keys command 476 includes generation of authentication keys 416 by an authentication-key software application. The authentication-key software application can be part of software application 412 or can be a software application external to software application 412. In embodiments where the authentication-key software application is external to software application 412, the external authentication-key software application can be executed either on computing device 104 on an authentication-key computing device other than computing device 104.

In particular embodiments, the authentication-key computing device can utilize the external authentication-key software application to generate authentication keys 416 and communicate authentication keys 416 to computing device 104, which can then store authentication keys 416 on active partition 310. Authentication keys 416 can be communicated to computing device 108 in via wireless interface 202, wired interface 206 and/or by permitting access to a storage device so that of computing device 104 can access authentication keys 416 stored on the storage device. Other techniques for communicating authentication keys 416 to computing device 104 are possible as well.

In embodiments where the authentication-key software application is part of software application 412, execution of determine authentication keys command 476 may be performed only after authentication-key-generation authority has been established, perhaps by use of a predetermined user identifier, authority classification, and/or other authentication criteria ensuring authentication-key-generation authority has been established.

In other embodiments, the authentication-key software application determines authentication keys 416 without generation at the time of execution of determine authentication keys command 476 (e.g., the authentication-key software application retrieves stored authentication keys in contrast to generating authentication keys).

In some embodiments, authentication keys are assumed to be valid. In other embodiments, software application 412 can verify that authentication keys 416 are valid for use with a predetermined implementation (i.e., specific version and/or functionality) of software application 412. In these embodiments, verified authentication keys can enable use of functionality of software application 412, such as, but not limited to, enabling: all functionality, specific functionality (e.g., a verified "networking" authentication key would enable use of networking functionality of software application 412, while an unverified "advanced interface" authentication key would not enable (and thus inhibit) use of an advanced interface to software application 412), use of specific or all functionality for a predetermined amount of time (e.g., use software application 412 for up to thirty days), a predetermined number of uses of software application 412 (e.g., use software application 412 up to one hundred times), a specific number of concurrent uses of software application 412 (i.e., seat licenses), and/or combinations thereof. Other authentication key techniques are possible as well.

Verification of an authentication key can include, but is not limited to, testing for the presence of one or more authentication keys, perhaps stored in one or more authentication-key files, querying for authentication-key records in a database (e.g., an authentication-key database) to find authentication keys and/or authentication-key values, comparing one or more authentication-key values associated with an authentication key to one or more known verified-authentication-key value, communicating with one or more servers via wireless network 110 and/or wired network 120 for authentication key-related information (e.g., authentication key retrieval, sending some or all of authentication keys 412 to the one or more servers for verification, verifying computing device 104 has a valid software license), and/or performing a calculation based on one or more authentication-key values. Other techniques for verifying authentication keys are possible as well.

In these embodiments, software application 412 can be inhibited partially or completely upon determining authentication keys 416 are unverified and/or not present. For example, if an authentication key associated with a specific functionality is either not present or present but not verified, use of the specific functionality can be inhibited. As another example, suppose a time-based authentication key is valid for a predetermined amount of time. After the predetermined amount of time, functionality associated with the time-based authentication key can be inhibited. Functionality associated with an authentication key can be specific (as described above) or generally enable all functionality of software application 412.

After authentication keys 416 have been determined for software application 412 and stored on active partition 310, copy authentication keys command 478 (shown in FIG. 4B as "Copy Auth Keys 478") copies authentication keys 416 on active partition 310 as authentication keys 426 stored on installation partition 320. In some embodiments, copy authentication keys command 478 executes automatically after determine authentication keys command 476; while in other embodiments, copy authentication keys command 478 executes in response to a user request or command, such as a command issued to software application 412.

In some scenarios, determine authentication keys command 476 and/or copy authentication keys command 478 are executed via use of a software package manager, described below in the context of FIG. 8.

As shown in FIG. 4B, at the end of scenario 460, active partition 310 stores operating system 410, software application 412, system parameters 414, and authentication keys 416; installation partition 320 stores software application package 420 and authentication keys 426; and restore partition 330 stores operating system image 430.

Figure 5:
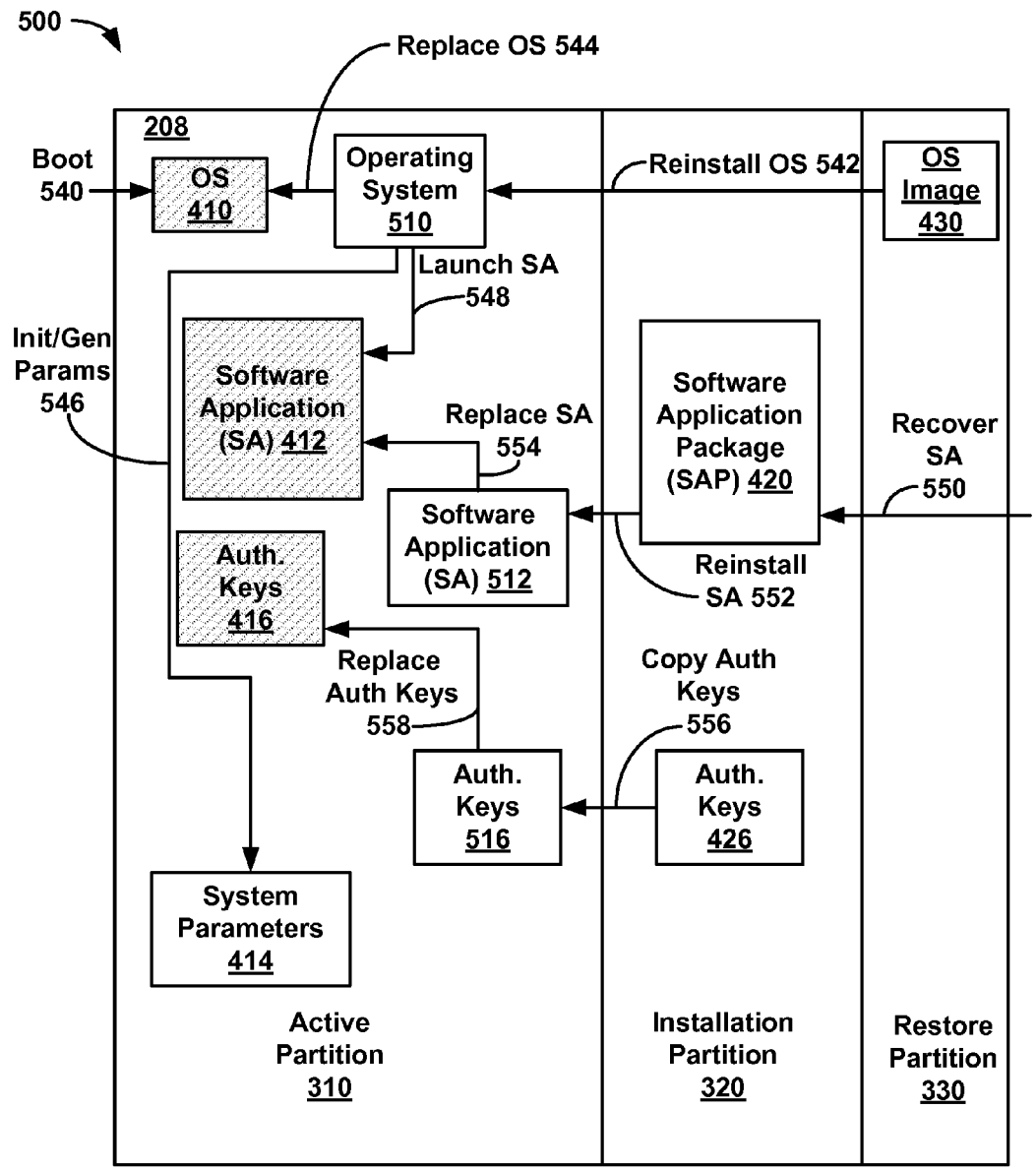
FIG. 5 illustrates a scenario for reinstalling an operating system and a software application.

FIG. 5 illustrates a scenario 500 for reinstalling an operating system and a software application. As described herein, scenario 500 begins after the techniques of scenarios 400 and 460 described above in the context of FIGS. 4A and 4B, respectively, have been carried out.

Scenario 500 assumes that data storage device 208 is communicatively coupled with computing device 104 and that data storage device 208 stores at least the data and software on partitions 310, 320, and 330 as indicated at the end of scenario 460.

Scenario 500 begins with boot command 540 that initializes computing device 104 and operating system 410. If operating system 410 fails to boot or is to be recovered for other reasons (e.g., partial boot failure, failure to recognize one or more devices, hardware failure, memory corruption, etc.), operating system 410 can be reinstalled from restore partition 330.

Reinstall operating system (OS) command 542 reinstalls operating system 410. An operating system can be reinstalled by retrieving a copy of an operating system from operating system image 430 stored on recovery partition 330 and storing the copy as operating system 510 on active partition 310. In some scenarios not shown in FIG. 5, reinstall operating system command 542 requires one or more additional boots of computing device 104, perhaps from a separate data storage device from data storage device 208 (i.e., booting from recovery-specific magnetic media, compact disk(s), or other media).

Replace operating system command 544 replaces a previous copy of the operating system (i.e., operating system 410) with the reinstalled copy of the operating system (i.e., operating system 510). Replace operating system command 544 can then delete previous copy of the operating system 410, perhaps as part of a procedure where reinstalled copy of operating system 510 overwrites previous copy of operating system 410. FIG. 5 shows previous copy of operating system 410 with crosshatching to signify that previous copy of operating system 410 has been deleted.

In other scenarios, reinstalled copy of operating system 510 is executed or otherwise tested prior to execution of replace operating system command 544. In some embodiments not shown in FIG. 5, reinstall operating system command 542 and replace operating system command 544 are performed using one command (e.g., reinstall operating system command 542 directly overwrites previous copy of operating system 410 with reinstalled copy of operating system 510).

The initialize/generate parameters command 546 ("Init/Gen Params 546" shown in FIG. 5) initializes and/or generates system parameters 414 used by operating system 510. Additional details regarding initialization and generation of system parameters are described above in the context of FIGS. 4A and 4B.

In still other embodiments not shown in FIG. 5, scenario 500 omits reinstall operating system command 542, replace operating system command, and/or initialize/generate parameters command 546. In such embodiments, previous copy of operating system 410 performs the activities described as being performed by reinstalled copy of operating system 510 in the remainder of scenario 500.

Launch software application (SA) command 548 starts execution of software application 412. In scenario 500, a determination is made that software application 412 is to be recovered; for example, software application 412 could fail to execute in response to launch software application command 548, one or more messages produced by software application 412 could request recovery of software application 412, one or more data or software files used by software application 412 could be determined to be missing (and then presumed to be deleted) or corrupted and, thus require recovery. Corruption can be detected by calculating a hash value (i.e., a checksum) or similar value of a given file and comparing the calculated checksum with a previously calculated checksum, perhaps stored on data storage device 208. If the calculated checksum is not the same as the previously calculated checksum, the given file can be determined to be a corrupt file. Other techniques for determining that software application 412 is to be recovered, including other techniques for determining file corruption, are possible as well.

Upon the determination that software application 412 is to be recovered, recover software application command 550 recovers a software application by replacing a "previous" copy of a software application with a "reinstalled" copy of the software application from installation partition 320. In scenario 500, the software application to be reinstalled is software application 422 (described above in more detail in the context of FIG. 4A) stored as part of software application package 420. In some embodiments, software application package 420 includes instructions and/or data (e.g., instructions 424 and data 426 described above in more detail in the context of FIG. 4A) used to reinstall software application 422. In some embodiments, recover software application command 550 is provided as an external command or input to software application package 420; while in other embodiments not shown in FIG. 5, software application 412 and/or software application package 420 automatically determines software application 412 is to be recovered, perhaps using the techniques discussed above in the context of launch software application command 548.

Reinstall software application command 552 retrieves a copy of the software application obtained from software application package 420 for reinstallation (e.g., software application 422) and stores the reinstalled copy as software application 512 on active partition 310.

Replace software application command 554 replaces the previous copy of the application program (i.e., software application 412) with the reinstalled copy of the software application (i.e., software application 512.) Replace software application command 554 can then delete previous copy of software application 412, perhaps as part of a procedure where reinstalled copy of software application 512 overwrites previous copy of software application 412. FIG. 5 shows previous copy of software application 412 with crosshatching to signify that previous copy of software application 412 has been deleted.

In other scenarios, reinstalled copy of software application 512 is tested or otherwise executed prior to execution of replace software application command 554. In some embodiments not shown in FIG. 5, reinstall software application command 552 and replace software application command 554 are performed using one command (e.g., reinstall software application command 552 directly overwrites previous copy of software application 412 with reinstalled copy of software application 512).

Copy authentication keys command 556 copies authentication keys 426 from installation partition 320 to reinstalled copy of authentication keys 516 stored on active partition 310. As mentioned in the context of FIG. 4A, authentication keys 426 are associated with software application 422 of software application package 420. Similarly, reinstalled authentication keys 516 are associated with reinstalled software application 512. Additional details of authentication keys 426 (and, by extension, reinstalled authentication keys 516) are discussed above in the context of FIG. 4A.

Replace authentication keys command 558 replaces one or more previous authentication keys (i.e., authentication keys 416) with the reinstalled authentication keys (i.e., authentication keys 516). Replace authentication keys command 558 can delete previous authentication keys 416, perhaps as part of a procedure where reinstalled authentication keys 516 overwrite previous authentication keys 416. FIG. 5 shows previous authentication keys 416 with crosshatching to signify that previous authentication keys 416 have been deleted. In some embodiments not shown in FIG. 5, copy authentication keys command 556 and replace authentication keys command 558 are performed using one command (e.g., replace authentication keys 556 command directly overwrites previous authentication keys 416 with reinstalled authentication keys 516).

In some embodiments not shown in FIG. 5, copy authentication keys command 556 and/or replace authentication keys command 558 are part of recover software application command 550.

In other embodiments not shown in FIG. 5, copy authentication keys command 556 and/or replace authentication keys command 558 are provided as external command(s) or input(s) to software application package 420 and/or software application 512; while in other embodiments not shown in FIG. 5, software application 512 and/or software application package 420 automatically determines authentication keys 426 are to be copied from installation partition 320 to active partition 310 to replace authentication keys 416.

In particular embodiments, instructions 422 stored as part of software application package 420 are configured to perform the techniques of reinstall software application command 552, replace software application command 554, copy authentication keys command 556, and/or replace authentication keys command 558. In some scenarios, some or all of commands 548-558 of scenario 500 related to software application are executed via use of a software package manager, described below in the context of FIG. 8. Other embodiments for executing commands of scenario 500 are possible as well.

As shown in FIG. 5, at the end of scenario 500, active partition 310 stores reinstalled copy of operating system 510, reinstalled copy of software application 512, system parameters 414, and reinstalled authentication keys 516; installation partition 320 stores software application package 420 and authentication keys 426, and restore partition 330 stores operating system image 430. During scenario 500, operating system 410, software application 412, and authentication keys 416 were deleted from active partition 310.

Figure 6:
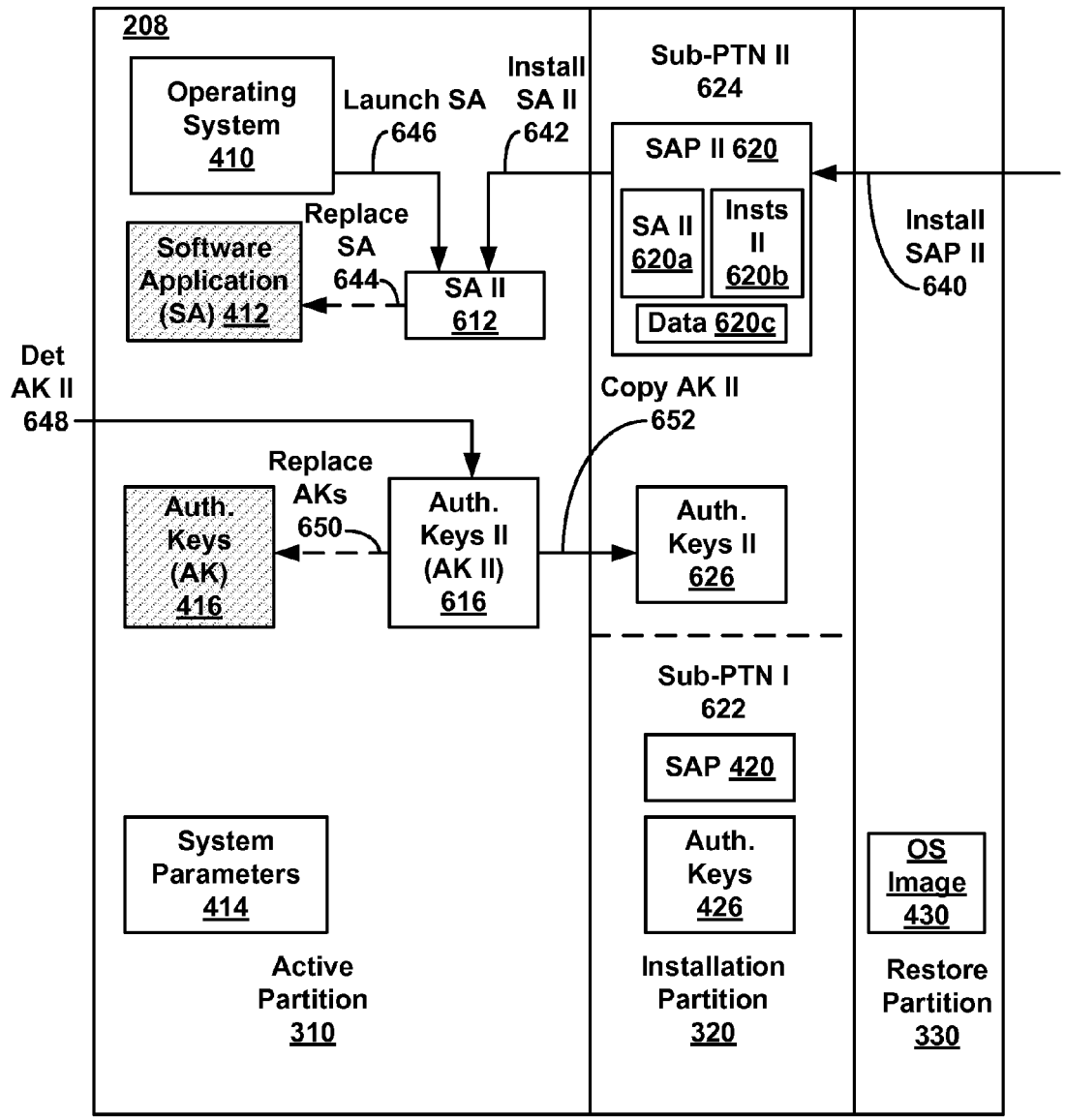
FIG. 6 illustrates a scenario for upgrading a software application.

FIG. 6 illustrates a scenario 600 for upgrading a software application. As described herein, scenario 600 begins after the techniques of scenarios 400 and 460 described above in the context of FIGS. 4A and 4B, respectively, have been carried out.

Scenario 600 assumes that data storage device 208 is communicatively coupled with computing device 104 and that data storage device 208 stores at least the data and software on partitions 310, 320, and 330 as indicated at the end of scenario 460.

Scenario 600 begins with install software application package II (SAP II) command 640, which stores software application package II 620 on installation partition 320. Like software installation package 420, software installation package II 620 can include a copy of a software application, denoted herein as software application II (SA II) 620a, one or more installation instructions 620b, and data 620c. Installation instructions 620b and data 620c of software application package II 620 are similar to instructions 422 and data 424, respectively described above in the context of FIGS. 4A, 4B, and 5.

Install software application package II command 640 can generate a sub-partitioning of installation partition 320 to permit storage of software application package 420 with associated authentication keys 426 in a first sub-partition (shown as sub-partition (PTN) I 622 of FIG. 6) and a software application package 620 with any associated authentication keys (e.g., authentication keys 626 described in detail below) in a second sub-partition, shown as sub-partition II 624 of FIG. 6. Each sub-partition has storage capacity for a software application package and can include a suitable directory or folder structure for storing the software application packages with associated authentication keys. In some embodiments, each sub-partition is a partition with memory storage allocated to store at least one software application package with associated authentication keys.

In embodiments not shown in FIG. 6, software application package 420 and software application package II 620 both are stored on installation partition 320 without explicit sub-partitions being generated (e.g., all software application packages are stored in a single directory or folder of installation partition 320). In other embodiments not shown in FIG. 6, install software application package II command 640 replaces software application package 420 with software application package II 620.

Install software application II command 642 copies software application II 620a from software application package II 620 as software application II 610 on active partition 310, using the techniques described above in the context of install software application command 444 of FIG. 4A.

Replace software application II command 644 replaces a previous copy of the application program (i.e., software application 412) with a new copy of the software application (i.e., software application II 612) leading to the deletion of software application 412 from active partition 310, using the techniques described above in the context of replace software application command 554 of FIG. 5. FIG. 6 shows previous copy of software application 412 with crosshatching to signify that previous copy of software application 412 has been deleted. In some embodiments, install software application II command 642 and replace software application II command 644 can be performed using one command using techniques described above in more detail in the context of FIG. 5.

Launch software application (SA) command 646 can start execution of software application II 612, using techniques described above in more detail in the context of FIG. 4B.

Determine authentication keys II (AK II) command 648 (shown in FIG. 6 as "Determine AK II 648") can be executed to determine one or more authentication keys II 616 for use with software application II 612. Authentication keys II 616 can be determined using either an external authentication-key software application or an authentication-key software application that is part of software application II 612, such as described above in more detail in the context of FIG. 4B. Authentication keys II 616 can include the types of authentication keys described above in more detail in the context of FIG. 4B. In some embodiments, software application II 612 can verify that authentication keys II 616 are correct authentication keys for use with a specific implementation (i.e., specific version and/or functionality) of software application II 612.

Replace authentication keys command 650 replaces one or more previous authentication keys (i.e., authentication keys 416) with current authentication keys (i.e., authentication keys II 616). Replace authentication keys command 650 can then delete previous authentication keys 416, perhaps as part of a procedure where current authentication keys II 616 overwrite previous authentication keys 416. FIG. 6 shows previous authentication keys 416 with crosshatching to signify that previous authentication keys 416 have been deleted. In some embodiments not shown in FIG. 5, determine authentication keys II command 648 and replace authentication keys command 650 are performed using one command (i.e., determine authentication keys II command 648 directly overwrites previous authentication keys 416 with current authentication keys II 616).

After authentication keys II 616 have been determined and stored on active partition 310, copy authentication keys II command 652 copies authentication keys 616 stored on active partition 310 as authentication keys II 626 stored on installation partition 320. In some embodiments, copy authentication keys II command 652 executes automatically after determine authentication keys II command 648 or replace authentication keys command 650; while in other embodiments, copy authentication keys II command 652 executes in response to a user request or command, such as a command issued to software application 612 or perhaps operating system 410.

In embodiments using two or more sub-partitions of installation partition 320, copy authentication keys II command 652 can copy authentication keys to the same sub-partition used to store an associated software application package. As shown in FIG. 6, copy authentication keys II command 652 copies authentication keys II 616 from active partition 310 to sub-partition II 624 of installation partition 320, as associated software application package II 620 is already stored on sub-partition II 624.

In other embodiments not shown in FIG. 6, determine authentication keys II command 648, replace authentication keys command 650, and/or copy authentication keys command 652 are not separate commands, but are instead part of install software application package II command 640 or install software application II command 642.

In some scenarios, some or all of commands 640-652 of scenario 600 are executed via use of a software package manager, described below in the context of FIG. 8.

As shown in FIG. 6, at the end of scenario 600, active partition 310 stores operating system 410, system parameters 414, software application II 612, and authentication keys II 616; installation partition 320 stores software application package 420 and authentication keys 426 in sub-partition I 622 and stores software application package II 620 and authentication keys II 626 in sub-partition II 624; and restore partition 330 stores operating system image 430. During scenario 600, software application 412 and authentication keys 416 were deleted from active partition 310.

Figure 7:
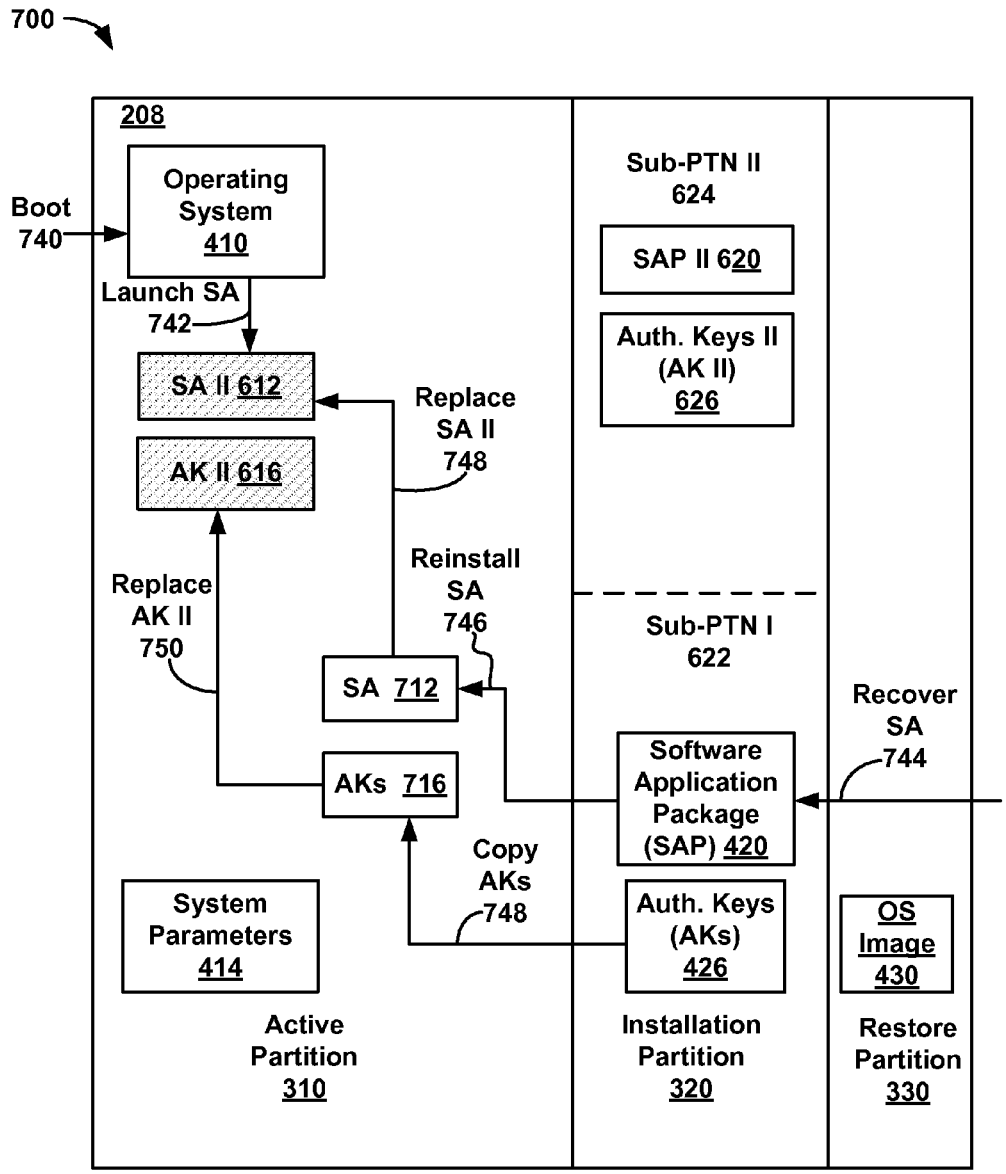
FIG. 7 illustrates a scenario for rolling back a software application.

FIG. 7 illustrates a scenario 700 for "rolling back" a software application. Rolling back involves reverting to an "older" version of software after a "newer" version of software has already been installed; i.e., the software is rolled back to the older version. As described herein, scenario 700 begins after the procedures of scenarios 400, 460, and 600 described above in the context of FIGS. 4A, 4B, and 6, respectively, have been carried out.

Scenario 600 assumes that data storage device 208 is communicatively coupled with computing device 104 and that data storage device 208 stores at least the data and software on partitions 310, 320, and 330 as indicated at the end of scenario 600.

Scenario 700 begins with boot 740 initializing computing device 104 and operating system 410.

Launch software application (SA) command 742 can start execution of software application II 612, using techniques described above in more detail in the context of FIGS. 4B and 6.

Upon the determination that software application 612 is to be rolled back, recover software application command 744 can recover a software application by replacing newer copy of software application 612 with older copy of software application 712 retrieved from installation partition 320. In scenario 700, older copy of software application 712 can be software application 422 stored as part of software application package 420. Recovering software applications is discussed in more detail above in the context of FIG. 5.

Reinstall software application command 746 restores a software application; as shown in FIG. 7, older copy of software application 712 is restored to active partition 310. The reinstall software application command is discussed in more detail above in the context of FIG. 5.

Replace software application II (SA II) command 748 replaces newer copy of software application 612 with older copy of the software application 712. Replace software application command 554 can then delete newer copy of software application 612, perhaps as part of a procedure where older copy of software application 712 overwrites newer copy of software application 612. FIG. 7 shows newer copy of software application 612 with crosshatching to signify that newer copy of software application 612 has been deleted.

In other scenarios, older copy of software application 712 is executed or otherwise tested prior to execution of replace software application command 748. In some embodiments not shown in FIG. 7, reinstall software application command 746 and replace software application command 748 are performed using one command (e.g., reinstall software application command 746 directly overwrites newer copy of software application 612 with older copy of software application 712).

Copy authentication keys command 748 copies authentication keys 426 from sub-partition I 622 of installation partition 320 to older authentication keys 716 stored on active partition 310. Additional details of authentication keys are discussed above in the context of FIG. 4A and the copy authentication keys command is discussed above in more detail in the context of FIG. 5.

Replace authentication keys II command 750 replaces one or more authentication keys associated with the newer software application (e.g., newer authentication keys II 616) with authentication keys associated with the older software application (e.g., older authentication keys 716). Replace authentication keys command 750 can then delete newer authentication keys 616, perhaps as part of a procedure where older authentication keys 716 overwrite previous authentication keys 616. FIG. 7 shows newer authentication keys 616 with crosshatching to signify that newer authentication keys 616 have been deleted. In some embodiments not shown in FIG. 7, copy authentication keys command 748 and replace authentication keys II command 750 are performed using one command (e.g., replace authentication keys II command 750 directly overwrites previous authentication keys 616 with reinstalled authentication keys 716).

In other embodiments not shown in FIG. 7, copy authentication keys command 748 and/or replace authentication keys II command 750 are provided as external command(s) or input(s) to software application package 420 and/or software application 712; while in other embodiments not shown in FIG. 5, software application 712 and/or software application package 420 automatically determines authentication keys 426 are to be copied from installation partition 320 to active partition 310 to replace authentication keys II 616.

In still other embodiments not shown in FIG. 7, authentication keys II 616 are "backward compatible"; that is, authentication keys associated with newer software applications (e.g., newer authentication keys II 616) can be used and, perhaps verified, by older software applications (e.g., software application 712). In these embodiments, copy authentication keys command 748 and replace authentication keys II command 750 may not be executed, perhaps after determining that older software application 712 can utilize newer authentication keys II 616.

In some scenarios, some or all of commands 742-750 of scenario 700 are executed via use of a software package manager, described below in the context of FIG. 8.

As shown in FIG. 7, at the end of scenario 700, active partition 310 stores operating system 410, system parameters 414, older software application 712, and older authentication keys 716; installation partition 320 stores software application package 420 and authentication keys 426 in sub-partition I 622 and stores software application package II 620 and authentication keys II 626 in sub-partition II 624, and restore partition 330 stores operating system image 430. During scenario 700, newer software application II 612 and newer authentication keys II 616 were deleted from active partition 310.

Figure 8A:
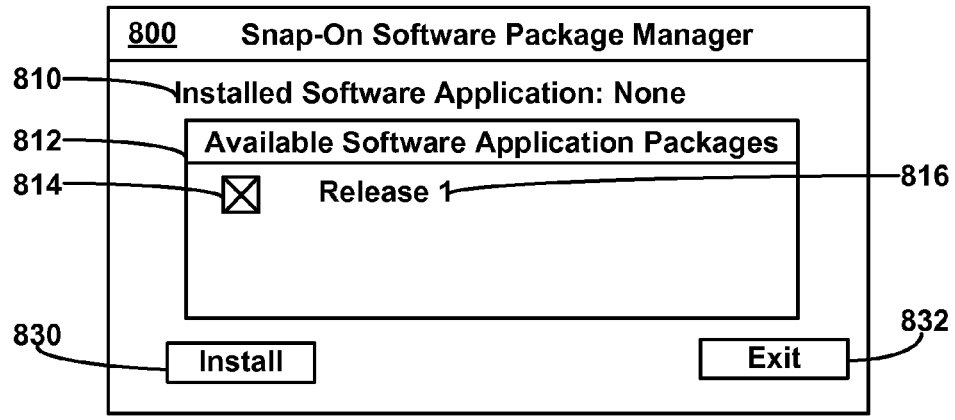
FIGS. 8A, 8B, and 8C illustrate an example user interface for managing software application packages.
Figure 8B:
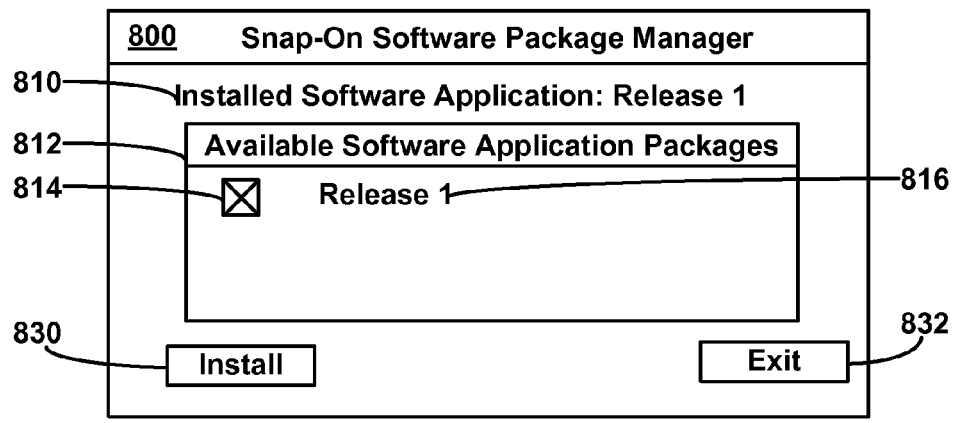
Figure 8C:
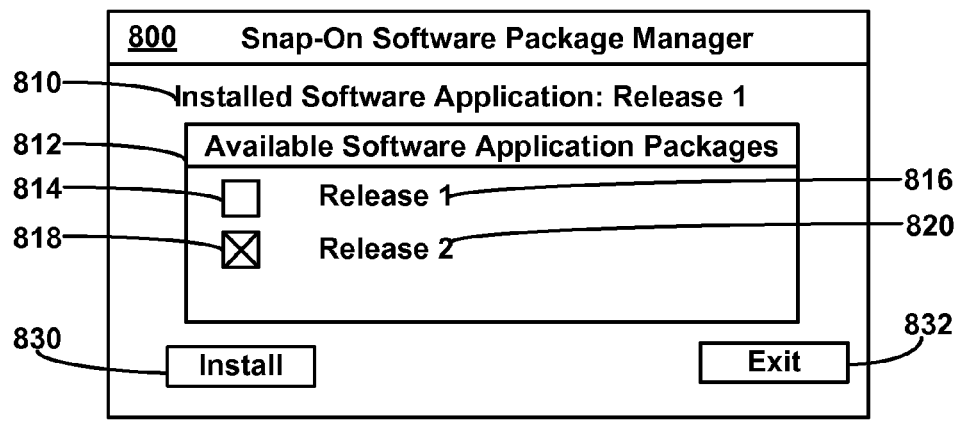

FIGS. 8A, 8B, and 8C illustrate an example user interface for managing software application packages. The example user interface can be provided by "software package manager" software executed on computing device 104 in communication with data storage device 208. In some embodiments, the software package manager can execute the commands related to software application packages, software applications, and/or authentication keys discussed as performed by a software application discussed in detail above in the context of FIGS. 4A, 4B, 5, 6, and 7.

FIG. 8A depicts software-application-package user interface 800 displaying installed application indicator 810, available-software-application-package dialog 812, install button 830, and exit button 832. The software-application-package user interface 800 of FIG. 8A could depict a status of a computing device (e.g., computing device 104) at the onset of scenario 400 described above in detail in the context of FIG. 4A.

FIG. 8A shows installed application indicator 810 indicating that no software application has been installed on the computing device. The displayed value of installed application indicator 810 could be determined based on a search of active partition 310 for the presence of one or more files, directories, folders, and/or data items indicating a software application package has been installed (e.g., search for presence of a folder or directory entitled "Snap-On Application R1", a file named "SnapOn_Veh_diag.exe", or data entries in a database indicating an installation/release status of software). In other embodiments, a search of installation partition 320 could determine the presence of one or more files, directories, folders, and/or data items as well.

FIG. 8A shows available-software-application-package dialog 812 with one available software release package, with selection box 814 and package title 816 of "Release 1." Selection box 814 can indicate that a particular software application package is selected or not selected; such selections can be indicated with an "X" as shown in selection box 814 as shown in FIG. 8A. When the particular software application package is not selected, a selection box can be empty, such as selection box 814 as shown in FIG. 8C. Other embodiments of selection box 814 are possible as well including, but not limited to, radio buttons, textual entry, clicking or double clicking a user input device (e.g., a mouse), and touch selection via a touch-enabled user input device (e.g., a touch screen).

Install button 830, when selected, can start installation of a selected available software application package. In the example shown in FIG. 8A, when install button 830 is selected, installation of software application package "Release 1" is initiated. As such, selection of install button 830 could initiate sending of an install software application command, such as described in more detail in the context of FIG. 4A.

Exit button 832, when selected, can terminate software-application-package user interface 800 without installing a software application package. In some embodiments, software-application-package user interface 800 is terminated once a selected software application package is installed without selection of exit button 832.

FIG. 8B depicts software-application-package user interface 800 after installation of a software application, as shown via installed application indicator 810 indicating that "Release 1" has been installed. As such, the software-application-package user interface 800 of FIG. 8B could depict a status of computing device 104 and data storage device 208 at the onset of scenario 500 described above in detail in the context of FIG. 5. As shown in FIG. 8B, as selection box 814 indicates that software application package "Release 1" would be installed, selection of install button 830 would start reinstallation of software application package "Release 1."

FIG. 8C depicts software-application-package user interface 800 after installation of software application "Release 1" indicated via installed application indicator 810 and with two available software application packages: "Release 1" as indicated by package title 816 and "Release 2" as indicated by package title 820. As such, the software-application-package user interface 800 of FIG. 8C could depict a status of the computing device at the onset of scenario 600 described above in more detail in the context of FIG. 6. As shown in FIG. 8B, as selection box 818 indicates that software application package "Release 2" would be installed, selection of install button 830 would start installation of software application package "Release 2."

In an example shown in FIGS. 8A-8C, software-application-package user interface 800 would differ from FIG. 8C at least as follows in a roll back scenario: installed application indicator 810 would indicate that "Release 2" is installed, selection box 814 for software application package "Release 1" would be selected, and selection box 818 for software application package "Release 2" would not be selected.

In some embodiments not shown in FIGS. 8A-8C, software-application-package user interface 800 can install a software application package without requiring any user selection of a software application package.

In other embodiments, software-application-package user interface 800 can inform a user of a status of software-application-package installation textually and/or graphically (e.g., text and/or graphics indicating "Release 1 installation is 55% complete"), completion of software-application-package installation, and/or report any errors detected during software-application-package installation.

IV. Example Operation

Figure 9:
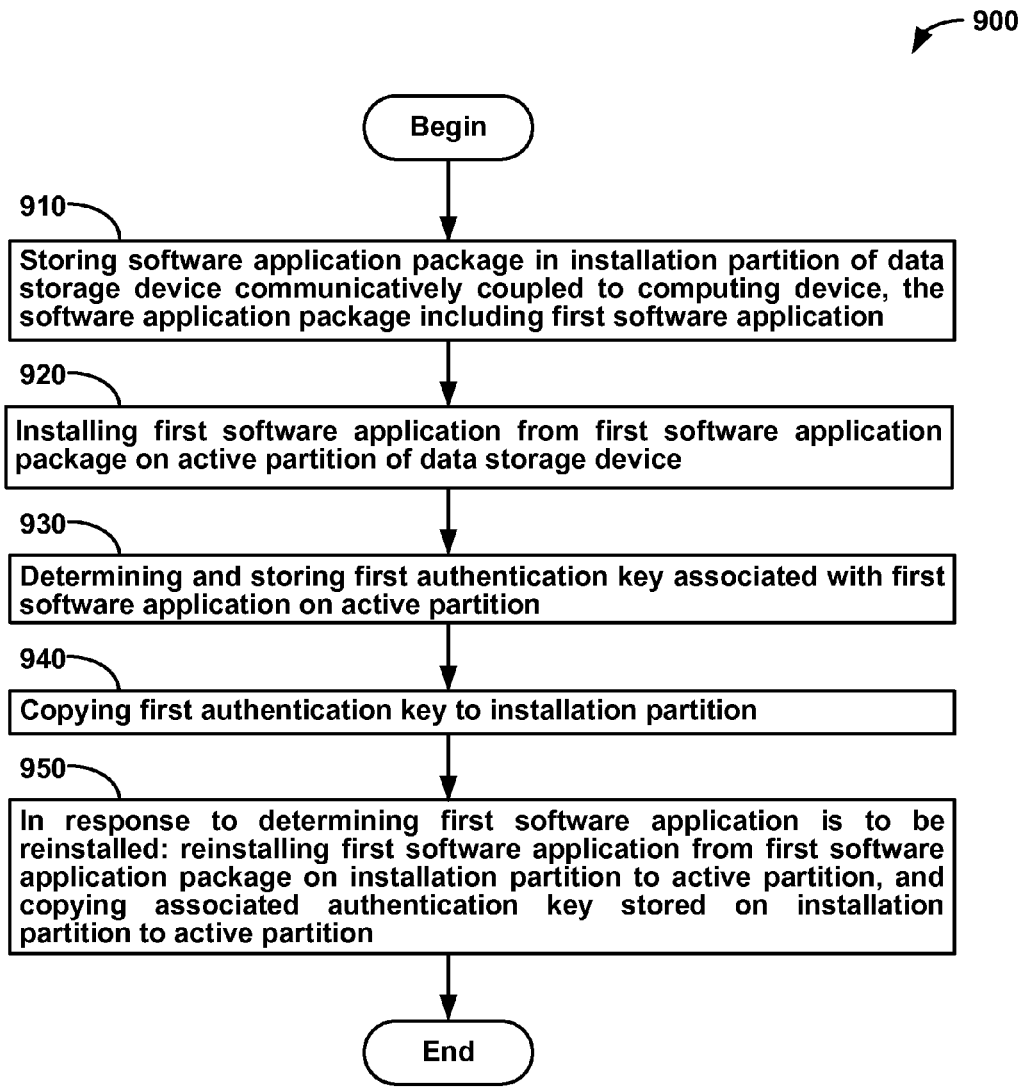
FIG. 9 is a flow chart depicting functions that may be carried out in accordance with an example embodiment.

FIG. 9 is a flow chart depicting functions that may be carried out in accordance with an example embodiment. For example, the functions 900 can be carried out by computing device 104 communicatively coupled with data storage device 208 described above in more detail in the context of FIGS. 1-8.

Functions 900 begin with block 910, which includes storing a first software application package in an installation partition of a data storage device of a computing device, where the first software application package includes a first software application. For example, the installation partition can be installation partition 310 of data storage device 208, which in turn is communicatively coupled to computing device 104, as described in more detail above in the context of at least FIGS. 1-7. Continuing the example, the first software application can be software application 422 and the first software package can be software application package 410 described in more detail above in the context of at least FIGS. 4-7 and/or the "Release 1" software package described in more detail above in the context of at least FIG. 8.

In some embodiments, the installation partition can be a visible partition; while in other embodiments, installation partition can be a hidden partition. In other embodiments, the data storage device further includes a restore partition configured to store at least an operating system image—the restore partition can be hidden or visible. Partitions of a data storage device are described in more detail above in the context of at least FIGS. 3-7.

Block 920 includes installing the first software application from the first software application package on an active partition of the data storage device. Installing a software application on an active partition, such as active partition 310, is described in more detail in the context of at least FIGS. 4A, 6, and 8. In some embodiments, a software application package can include application instructions configured to install the first software application on an active partition of the data storage device, such as described above in the context of at least FIGS. 4A, 5, 6, and 7.

Block 930 includes determining a first authentication key and storing the first authentication key on the active partition, where the first authentication key is associated with the first software application. Determining an authentication key that is stored on an active partition and associated with a software application is described above in more detail in the context of at least FIGS. 4B and 6. Authentication keys can allow some or all functionality of a software application, perhaps after being verified, such as discussed above in detail in the context of at least FIGS. 4B and 7.

In particular embodiments, the first software application is configured to: determine that the first authentication key is a verified authentication key and either (a) allow functionality of the first software application if the first authentication key is verified or (b) inhibit the functionality of the first software application if the first authentication key is not verified. Authentication keys are discussed above in detail in the context of at least FIGS. 4B and 7.

Block 940 includes copying the first authentication key to the installation partition. Copying authentication keys from an active partition to an installation partition is described above in more detail in the context of at least FIGS. 4B and 6.

Block 950 includes both reinstalling the first software application from the first software application package on the installation partition to the active partition and copying the associated authentication key stored on the installation partition to the active partition, in response to determining the first software application is to be reinstalled. Determining a software application is to be reinstalled is described above in more detail in the context of at least FIGS. 5, 7, and 8. Reinstalling software in a software application package from the installation partition to the active partition and copying associated authentication keys from the installation partition to the active partition is discussed above in more detail in the context of at least FIGS. 5, 7, and 8.

In some embodiments, functions 900 include storing a second software application package on the installation partition, where the second software application package further comprises a second software application. For example, the second software application package can be software application package 620 that includes software application 620a, described above in more detail in the context of FIGS. 6 and 7 and/or the "Release 2" software package described in more detail above in the context of at least FIG. 8.

In some embodiments, the second software package can be stored separately from the first software package. In alternative embodiments, the second software application can be installed on the active partition, thereby replacing the first software application, and a second authentication key associated with the second software application can be determined and stored on the active partition, thereby replacing the first application key. Storing the second software application package and associated authentication key is described above in more detail in the context of at least FIGS. 6, 7, and 8.

In such embodiments, functions 900 can further include: installing the second software application from the second software application package on the installation partition on the active partition, determining a second authentication key stored on the active partition, where the second authentication is associated with the second software application, and copying the associated authentication key to the installation partition, as described above in more detail in the context of at least FIGS. 6, 7, and 8.

Functions 900 can further include determining that an active software application stored on the active partition is to be reinstalled, responsively receiving a selection to reinstall either the first software application package or the second software application package, in response to the selection indicating the first software application package is to be reinstalled, reinstalling the first software application from the first software application package on the installation partition to the active partition as the active software application, and in response to the selection indicating the second software application package is to be reinstalled, reinstalling the second software application from the second software application package on the installation partition to the active partition as the active software application. Reinstallation of software application packages is described above in more detail in the context of at least FIGS. 5, 7, and 8.

Figure 10:
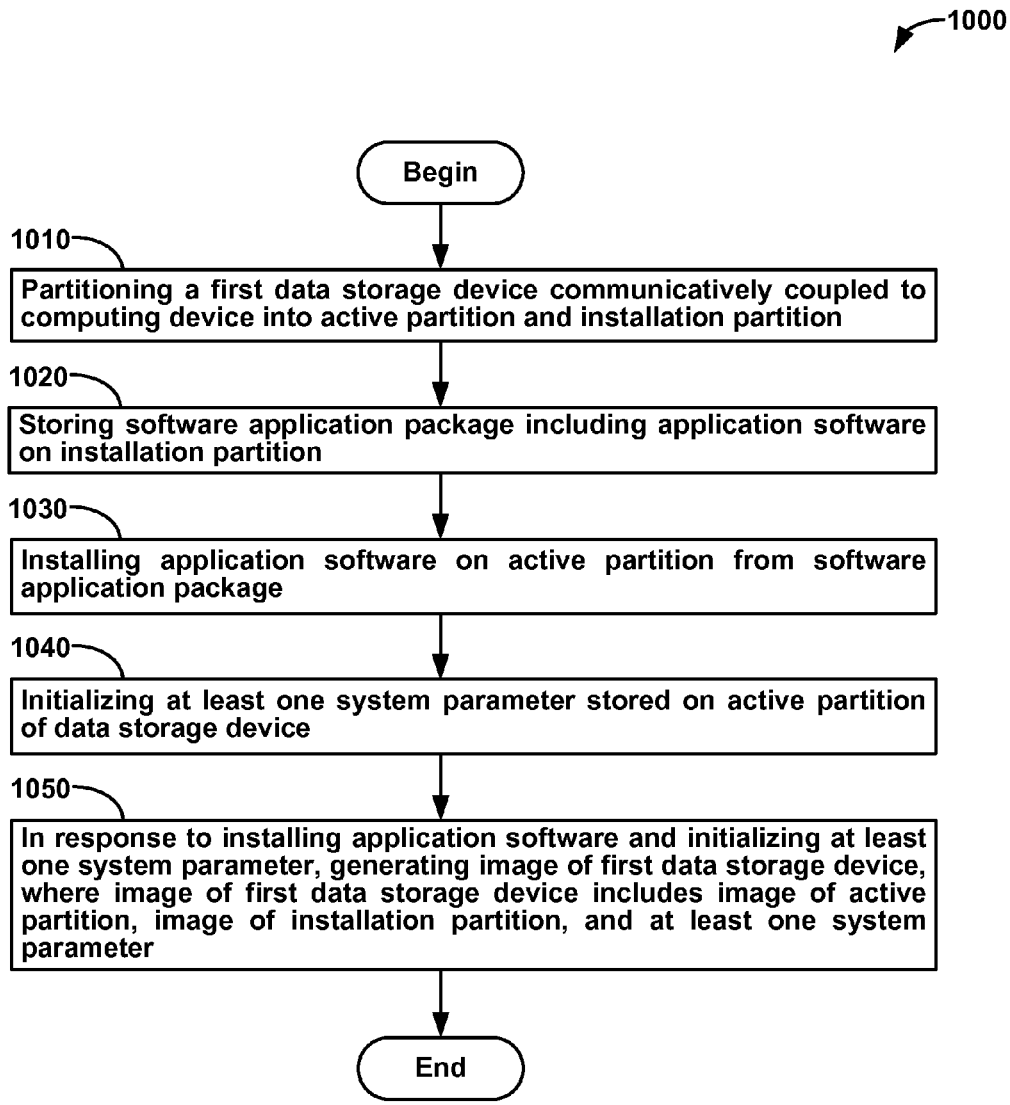
FIG. 10 is a flow chart depicting functions that may be carried out in accordance with an example embodiment.

FIG. 10 is a flow chart depicting functions 1000 that may be carried out in accordance with an example embodiment. For example, functions 1000 can be carried out by computing device 104 communicatively coupled with data storage device 208 described above in more detail in the context of FIGS. 1-9.

Block 1010 includes partitioning a first data storage device communicatively coupled to a computing device into at least an active partition and an installation partition. For example, the installation partition can be installation partition 310 of data storage device 208, which in turn is communicatively coupled to computing device 104, as described in more detail above in the context of at least FIGS. 1-9.

Block 1020 includes storing a software application package in the installation partition. The software installation package can include application software and, perhaps, installation instructions. Storing software application packages is discussed above in greater detail in the context of at least FIGS. 4A, 4B, 5, 6, 7, 8, and 9.

Block 1030 includes installing the application software on the active partition from the software application package. Installing software applications from software application packages is discussed above in greater detail in the context of at least FIGS. 4A, 4B, 5, 6, 7, 8, and 9.

Block 1040 includes initializing at least one system parameter stored on the active partition of the data storage device. Initializing system parameters is discussed above in greater detail in the context of at least FIG. 4A.

Block 1050 includes generating an image of the first data storage device in response to installing the application software and initializing the at least one system parameter. The image of the first data storage device includes an image of the active partition and an image of the installation partition. Generating images of data storage devices is discussed above in greater detail in the context of at least FIG. 4A.

In some embodiments, functions 1000 further include storing the generated image of the first data storage device on a cloning data storage device. In these embodiments, functions 1000 can further include copying the generated image from the cloning data storage device on a second data storage device, wherein the second data storage device is not the first storage device. Cloning data storage devices are discussed above in more detail in the context of at least FIG. 4A.

In still other embodiments, an authentication key associated with the software application is determined, perhaps using an authentication-key software application. In these embodiments, the software application is configured to: determine that the first authentication key is a verified authentication key and either (a) allow functionality of the first software application if the first authentication key is verified or (b) inhibit the functionality of the first software application if the first authentication key is not verified. Authentication-key software applications and authentication keys are discussed above in detail in the context of at least FIGS. 4B, 6, and 7.

V. Conclusion

Example embodiments of the present invention have been described above. Those skilled in the art will understand that changes and modifications may be made to the described embodiments without departing from the true scope and spirit of the present invention, which is defined by the claims.

We claim:

1. A method, comprising:

storing a first software application package using a computing device in an installation partition of a data storage device communicatively coupled to the computing device, wherein the first software application package comprises a first software application and installation instructions;

installing the first software application from the first software application package onto an active partition of the data storage device by the computing device executing the installation instructions of the first software application package;

determining a first authentication key associated with the first software application by at least:

determining whether the first software application is authorized to generate the first authentication key, and after determining that the first software application is authorized to generate the first authentication key, generating the first authentication key;

storing the first authentication key on the active partition using the computing device;

copying the first authentication key to the installation partition using the computing device; and in response to determining that the first software application is to be reinstalled on the active partition, the computing device executing the installation instructions of the first software application package stored on the installation partition for:
  reinstalling the first software application from the first software application package stored on the installation partition to the active partition, and
  copying the associated authentication key stored on the installation partition to the active partition.

2. The method of claim 1, further comprising:
storing a second software application package on the installation partition, wherein the second software application package further comprises a second software application.

3. The method of claim 2, further comprising:
installing the second software application from the second software application package on the installation partition onto the active partition;
determining a second authentication key stored on the active partition, wherein the second authentication key is associated with the second software application; and
copying the second authentication key to the installation partition.

4. The method of claim 3, wherein installing the second software application comprises replacing the first software application stored on the active partition with the second software application, and wherein determining the second authentication key comprises replacing the first authentication key stored on the active partition with the second authentication key.

5. The method of claim 2, wherein storing the second software application package on the installation partition comprises replacing the first software application package stored on the installation partition with the second software application package.

6. The method of claim 2, wherein storing the second software application package on the installation partition comprises storing the second software application package on the installation partition separately from the first software application package stored on the installation partition.

7. The method of claim 6, further comprising:
determining that an active software application stored on the active partition is to be reinstalled;
responsively receiving a selection to reinstall either the first software application or the second software application;
in response to the selection indicating the first software application is to be reinstalled, reinstalling the first software application from the first software application package stored on the installation partition to the active partition as the active software application; and
in response to the selection indicating the second software application is to be reinstalled, reinstalling the second software application from the second software application package stored on the installation partition to the active partition as the active software application.

8. The method of claim 1, wherein the first software application is configured to:
determine that the first authentication key is a verified authentication key; and
enable a functionality of the first software application, in response to determining that the first authentication key is the verified authentication key, or
inhibit the functionality of first software application, in response to determining that the first authentication key is not the verified authentication key.

9. The method of claim 1, wherein the installation partition is configured as a hidden partition.

10. The method of claim 1, wherein determining that the first software application is to be reinstalled comprises determining at least one of: (i) the first software application failed to execute; (ii) the first software application is missing a file; (iii) the first software application has a corrupted file; and (iv) a prior version of the first software application is required.

11. A computing device, comprising:
a data storage device, configured with at least an active partition and an installation partition, wherein the installation partition stores a software application package, wherein the software application package comprises a software application;
a processor; and
instructions, stored in the data storage device, that upon execution by the processor, cause the computing device to perform functions comprising:
  installing the software application from the software application package stored on the installation partition to the active partition, using the software application package;
  determining an authentication key associated with the software application by at least:
    determining whether the first software application is authorized to generate the authentication key, and
    after determining that the first software application is authorized to generate the authentication key, generating the authentication key;
  storing the authentication key on the active partition;
  saving the associated authentication key on the installation partition; and
  in response to determining that the software application is to be reinstalled on the active partition, using the software application package stored on the installation partition for:
    reinstalling the software application from the software application package stored on the installation partition to the active partition, and
    copying the associated authentication key stored on the installation partition onto the active partition.

12. The device of claim 11, wherein the functions further comprise:
storing a second software application package on the installation partition, wherein the second software application package further comprises a second software application.

13. The device of claim 12, wherein the functions further comprise:
installing the second software application from the second software application package on the installation partition onto the active partition;
determining a second authentication key stored on the active partition, wherein the second authentication is associated with the second software application; and
copying the associated authentication key to the installation partition.

14. The method of claim 12, further comprising:
determining that an active software application stored on the active partition is to be reinstalled;
responsively receiving a selection to reinstall either the software application or the second software application;
in response to the selection indicating the software application is to be reinstalled, reinstalling the first software application from the software application package stored on the installation partition to the active partition as the active software application; and
in response to the selection indicating the second software application package is to be reinstalled, reinstalling the second software application from the second software application package stored on the installation partition to the active partition as the active software application.

15. The device of claim 11, wherein the software application is configured to:
   determine that the authentication key is a verified authentication key; and
   allow a functionality of the software application, in response to determining that the authentication key is the verified authentication key, or
   inhibit the functionality of the software application, in response to determining that the authentication key is not the verified authentication key.

16. The device of claim 11, wherein the data storage device further comprises a backup partition, and wherein the backup partition is configured to store an image of an operating system.

17. The device of claim 11, wherein determining that the software application is to be reinstalled comprises determining at least one of: (i) the software application failed to execute; (ii) the software application is missing a file; (iii) the software application has a corrupted file; and (iv) a prior version of the software application is required.

* * * * *